(12) United States Patent
Prelec, Sr.

(10) Patent No.: US 7,554,286 B2
(45) Date of Patent: Jun. 30, 2009

(54) PROTECTIVE CASING FOR BATTERY CHARGER

(76) Inventor: Michael L. Prelec, Sr., 4175 Hwy. 11, Deland, FL (US) 32724

( * ) Notice: Subject to any disclaimer, the term of this patent is extended or adjusted under 35 U.S.C. 154(b) by 310 days.

(21) Appl. No.: 11/185,412

(22) Filed: Jul. 20, 2005

(65) Prior Publication Data

US 2007/0029964 A1     Feb. 8, 2007

(51) Int. Cl.
*H01M 6/50* (2006.01)

(52) U.S. Cl. .................... 320/107; 320/104; 320/128

(58) Field of Classification Search ............... 320/107, 320/109, 104, 108, 110; 307/10.7; 429/96, 429/100
See application file for complete search history.

(56) References Cited

U.S. PATENT DOCUMENTS

| | | | | |
|---|---|---|---|---|
| 4,735,592 A | * | 4/1988 | Griffin | 446/404 |
| 4,966,569 A | * | 10/1990 | Asano | 446/440 |
| 5,368,516 A | * | 11/1994 | Hoeting et al. | 446/288 |
| 5,505,493 A | * | 4/1996 | Camfield et al. | 280/828 |
| 6,322,921 B1 | * | 11/2001 | Iwaizono et al. | 429/56 |
| 6,388,885 B1 | * | 5/2002 | Alexander et al. | 361/760 |
| 6,456,041 B1 | * | 9/2002 | Terada et al. | 320/132 |
| 6,509,719 B2 | * | 1/2003 | Crofut et al. | 320/134 |
| 2001/0022564 A1 | * | 9/2001 | Youngquist et al. | 345/55 |
| 2003/0207993 A1 | * | 11/2003 | Akiyama et al. | 525/89 |
| 2004/0169489 A1 | * | 9/2004 | Hobbs | 320/104 |
| 2005/0168332 A1 | * | 8/2005 | Conte | 340/475 |
| 2006/0017454 A1 | * | 1/2006 | Bhatti | 324/765 |
| 2006/0214635 A1 | * | 9/2006 | Prelec | 320/114 |

* cited by examiner

*Primary Examiner*—Akm E Ullah
*Assistant Examiner*—Arun Williams
(74) *Attorney, Agent, or Firm*—McKinney Law, PLLC

(57) ABSTRACT

A battery charger casing for providing increased protection from impact, corrosion and moisture intrusion. The present invention includes a shell that is secured to the casing forming a protective void to house the electrical circuitry. An epoxy material encapsulates the electrical circuitry within the protective void providing increased impact protection, heat dissipation and weather proofing characteristics.

16 Claims, 2 Drawing Sheets

PROTECTIVE CASING FOR BATTERY CHARGER

BACKGROUND OF THE INVENTION

1. Field of the Invention

The present invention relates generally to battery chargers, and more specifically to a battery charger with an improved casing for protecting its electronic circuitry.

2. Description of the Prior Art

To charge a battery, the battery charger is typically placed within a few feet of the battery and one connection is made to the battery and a second connection is made to an alternating current (AC) power source. The battery charger is left connected for several hours to several weeks or months depending on the application. If the battery charger is left unattended for a significant amount of time, it is imperative the battery charger is protected from being damaged from impacts, corrosion and moisture intrusion. A damaged battery charger may result in a fire or cause substantial damages from its malfunction. There is a need for a battery charger that can be left unattended for long periods of time without fear that the battery charger will be damaged.

Many battery chargers exist with a thin metal casing containing the electrical circuitry. Should these types of battery chargers accidentally be dropped or otherwise sustain impact, the likelihood of damage to the internal circuitry is great. Other prior art battery chargers are encased in plastic and the electrical circuitry similarly can be damaged by an impact. There is a need for a battery charger casing that has improved impact protection characteristics.

Typically, when the battery charger is used to replenish a vehicle battery, the charger is placed in a garage. However, even a battery charger used in a garage is susceptible to moisture intrusion. Similarly, when a battery charger used to charge a watercraft battery, there is a high probability of moisture coming into contact with the battery charger. This can lead to disastrous results as the battery of a watercraft may operate the bilge pump. Accordingly, if the battery charge is insufficient and the electric bilge pump does not operate, in an extreme situation this may lead to the watercraft sinking. Therefore, it is imperative that the battery charger is not susceptible to corrosion and moisture intrusion so that a battery remains charged to protect from property loss. There is a need to provide a battery charger that is water resistant and able to withstand a hostile environment.

Batteries are available in different voltages depending on the purpose of the battery and requirements of the vehicle or watercraft. Accordingly, battery chargers are available in different power input and output. In many countries, the AC voltage is 110 V, however in some countries the AC voltage is higher and have different power source connections. This results in a different battery charger being required for each different power source. In prior art chargers, the electrical connections are permanently hard wired into the internal circuitry of the battery charger. It is difficult to determine quickly whether a battery charger is wired for 110 V or some other voltage, as battery charger casings are often indistinguishable. A battery charger casing that quickly identifies the battery charger's power source requirements and output is needed.

Accordingly, what is needed in the art is a battery charger casing with increased protection of the electrical circuitry and unique identification characteristics that overcomes the limitations of prior art battery charger casings and provides an improvement that is a significant contribution to the advancement of the battery charger casing art.

However, in view of the prior art at the time the present invention was made, it was not obvious to those of ordinary skill in the pertinent art how the identified needs could be fulfilled.

SUMMARY OF THE INVENTION

The present invention is a battery charger casing comprising an independent power source capable of supplying a steady state electrical current, electrical circuitry for transforming the steady state electrical current to a predetermined electrical current to charge a battery wherein the electronic circuitry comprises mounted circuit board components, a power wire in electrical communication with a power plug and the electrical circuitry wherein the power plug is in electrical communication with the independent power source, a battery wire in electrical communication with a quick connect plug and the electrical circuitry wherein the quick connect plug is in electrical communication with the battery, a shell removably secured to the casing forming a protective void to house the electrical circuitry wherein a bottom plate and the circuitry of the shell is removable from the casing so that an alternative casing can be substituted, an epoxy material encapsulating the electrical circuitry within the protective void wherein a protective epoxy layer is interposed between the bottom plate and the electrical circuitry, a headlight indicator LED mounted in a simulated headlight of the casing so that the mode of operation of the battery charger circuitry can be determined, a first indicator LED mounted in a first simulated engine cylinder of the shell so that a first function of an operation of the electrical circuitry can be monitored, a second indicator LED mounted in a second simulated engine cylinder of the shell so that a second function of an operation of the electrical circuitry can be monitored, an audio computer chip that produces sounds that simulate a motorcycle engine, a battery that comprises an auxiliary connect plug so that the battery can be quickly disconnected from the battery charger casing, a first terminal in electrical communication with the electrical circuitry and receptive to the battery wire wherein the battery wire is removably attached to the first terminal and comprises a quick connect plug, a second terminal in electrical communication with the electrical circuitry and receptive to the battery wire wherein the battery wire is removably attached to the second terminal and comprises a quick connect plug, and a front terminal in electrical communication with the electrical circuitry and receptive to the power wire wherein the power wire is removably attached to the front terminal and comprises a quick connect plug.

In the preferred embodiment, the casing is in the predetermined shape of a motorcycle such as a Harley Davidson®. A first and second wheel are disposed about the front and rear of the casing similar to a motorcycle so that the battery charger casing is elevated from the floor.

A primary object of the invention is to provide an apparatus that improves the protection of battery charger circuitry from impacts such as being dropped.

Another very important object of the invention is to provide an apparatus that improves the protection of battery charger circuitry from inadvertent grounding.

Another important object of the invention is to provide a means to determine the current mode of operation and status of the battery charging process.

Still another very important object of the invention is to provide an apparatus that improves the protection of battery charger circuitry from corrosion and moisture intrusion.

Another very important object of the invention is to provide a battery charger casing that provides a means to quickly identify the battery charger and its characteristics to avoid unintentional misuse.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
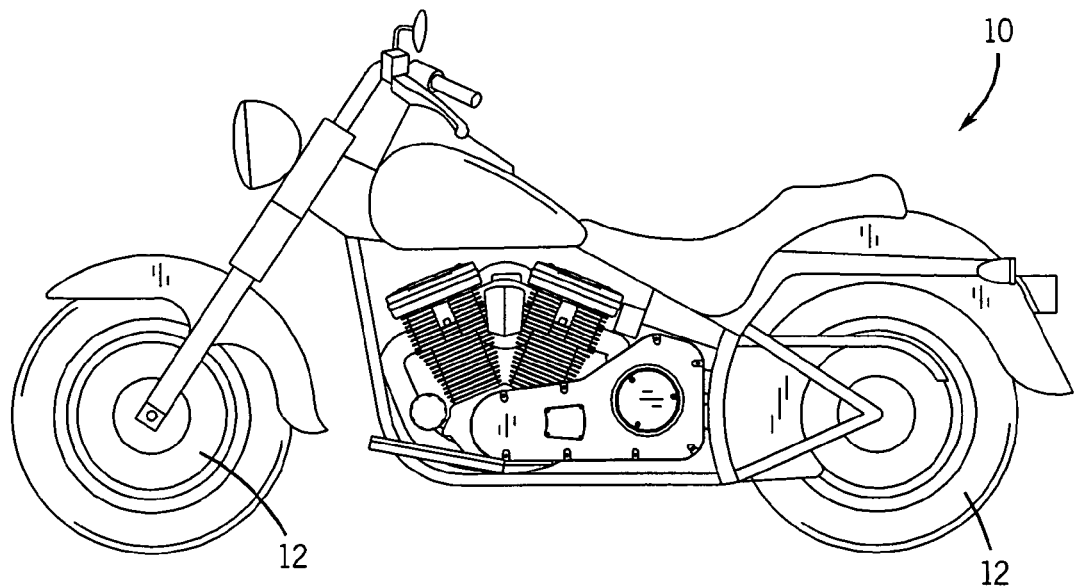
FIG. 1 is a side perspective view of a battery charger casing in accordance with the present invention.

FIG. 1 shows one embodiment of a battery charger casing generally denoted 10. In the preferred embodiment the casing 10 protects battery charger circuitry 50 from impacts from being dropped. Wheels 12 form an insulator to protect circuitry 50 from accidental grounding. Additionally, wheels 12 elevate casing 10 from the floor surface where water or other conductive liquids may be present and allow casing 10 to be moved easily without sliding directly on the floor. When circuitry 50 is in use, a power source (not shown) is in electrical communication with battery charger circuitry 50 contained within shell 15. The power source provides the current to activate the battery charger circuitry 50 that ultimately provides the proper current to charge a lead acid battery (not shown). Battery charger circuitry 50 is capable of handling input power of alternating current voltage of between 90 and 240 volts at 50 or 60 hertz. When circuitry 50 is in use, a battery wire and quick connect plug are in electrical communication with a lead acid battery (not shown).

As illustrated in FIG. 1, when the power wires and battery charging wires are removed from casing 10, the casing 10 provides a unique configuration that replicates a Harley Davidson® motorcycle. In addition to providing increased protection to the battery charger circuitry 50, the unique casing configuration 10 allows an individual to quickly identify a battery charger and its intended use. For example, a motorcycle shaped battery charger is for charging a motorcycle, although the present invention's utility is not limited to charging motorcycle batteries.

Figure 2:
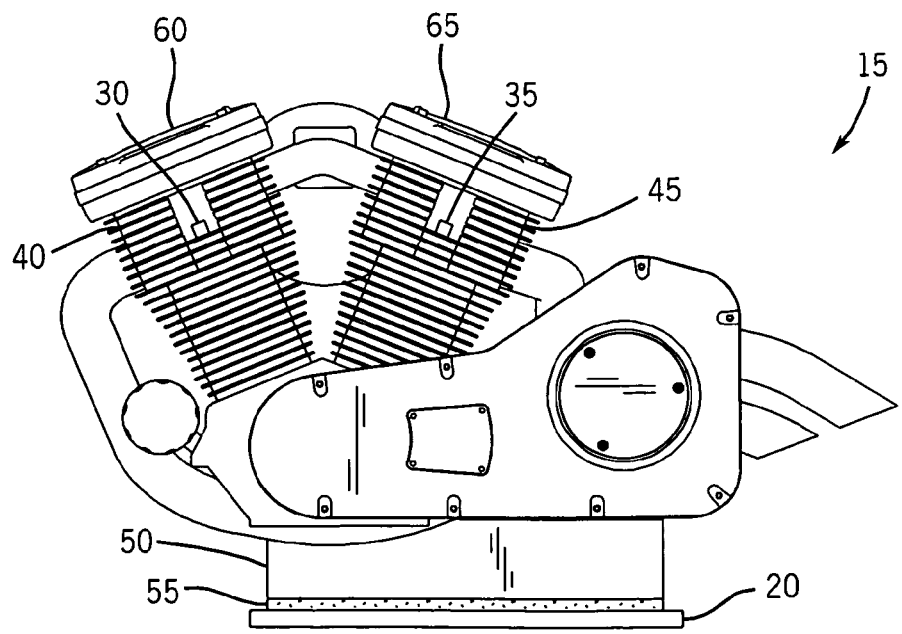
FIG. 2 is a side perspective and partially exploded view of a shell of the battery charger casing, shown separately for clarity of illustration in accordance with the present invention.

FIG. 2 is a side perspective view of shell 15 that shows a bottom plate 20 removed from shell 15. A layer of epoxy 55 is interposed between bottom plate 20 and battery charger circuitry 50. Epoxy 55 provides an effective means to dissipate heat generated by circuitry 50. To quickly determine the mode of operation of battery charger circuitry 50, a first indicator LED 60 is mounted on a first cylinder 40 of the shell 15 as shown in FIG. 2. A second indicator LED 65 is mounted on a second cylinder 45 and is used to show additional predetermined functions of the current operation of circuitry 50. A first terminal 30 is provided on first cylinder 40 and is receptive to a quick connector well known in the industry so that a battery wire and plug can be easily attached and removed from casing 10 for charging a battery. Similarly, a second terminal 35 is receptive to a quick connector so that a second battery can be plugged in and charged by the present invention. First terminal 30 and second terminal 35 are in electrical communication with circuitry 50.

Figure 3:
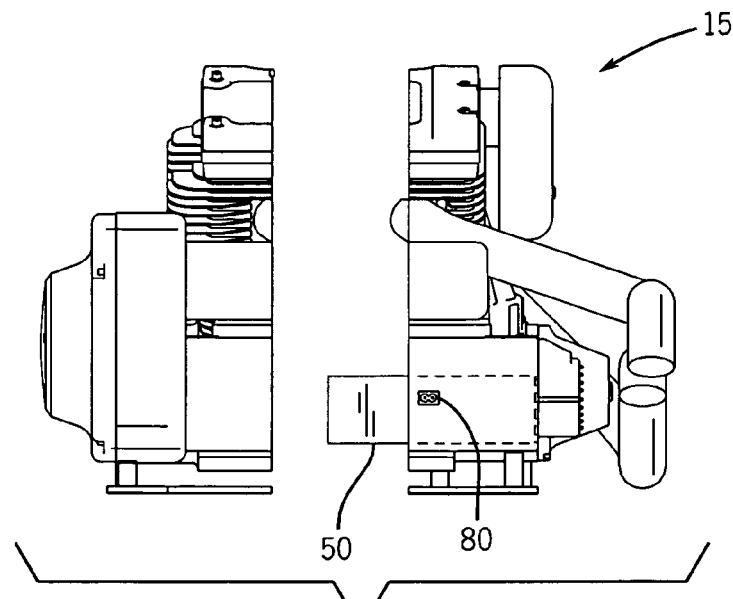
FIG. 3 is a frontal perspective and partially exploded view of a shell of the battery charger casing, shown separately for clarity of illustration in accordance with the present invention.

FIG. 3 shows a frontal perspective and exploded view of the preferred embodiment of shell 15, shown separately for clarity of illustration. Charger circuitry 50 is shown interposed between two halves of shell 15. Epoxy encapsulates the circuitry 50 within shell 15 providing complete protection from impact, moisture intrusion and corrosion. In the preferred embodiment, battery charger circuitry 50 comprises mounted circuit board components. Front terminal 80 is receptive to a quick connector so that a power wire can easily be attached and removed from casing 10. Terminal 80 is in electrical communication with circuitry 50.

Figure 4:
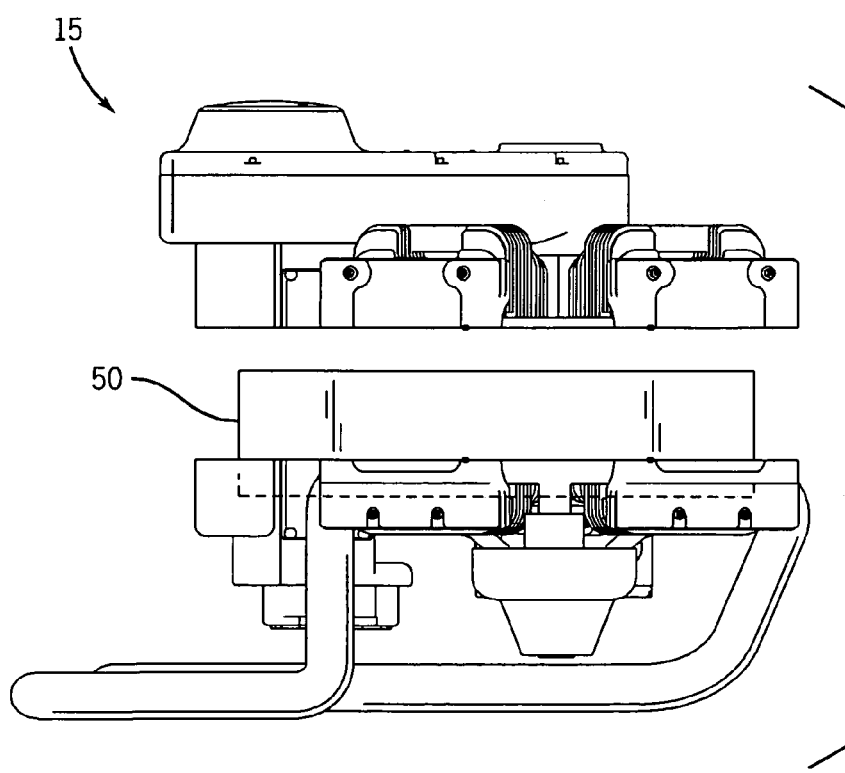
FIG. 4 is a top and partially exploded view of a shell of the battery charger casing, shown separately for clarity of illustration in accordance with the present invention.

Referring to FIG. 4, a top exploded view of shell 15 is shown with circuitry 50. Shell 50 is formed of two asymmetrical halves that when placed adjacent form an internal void about the perimeter of shell 15. Bottom plate 20 is not shown for clarity of illustration. Within the void as described above, resilient epoxy is used to encapsulate circuitry 50 to protect against impact and moisture. In the preferred embodiment, the bottom plate 20 is irremovably attached to shell 15.

In an alternative embodiment, bottom plate 20 and circuitry 50 are removable and a different pre-determined shaped casing (not shown) such as a BMW®, Honda® or Yamaha® shaped casing can replace the original casing 10. This also allows for the replacement of circuitry 50 should it malfunction and need to be replaced. Shell 15 is slid into place and secured to casing 10 with appropriate biasing means well known in the art to cover circuitry 50. In another alternative embodiment, an audio computer chip (not shown) is mounted within casing 10 and produces sounds that simulate a motorcycle engine.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown. It is therefore evident that the particular embodiments disclosed above may be altered or modified and all such variations are considered within the scope and spirit of the invention.

It is also to be understood that the following claims are intended to cover all of the generic and specific features of the invention herein described, and all statements of the scope of the invention, which as a matter of language, might be said to fall therebetween.

Now that the invention has been described,

What is claimed is:

1. A protective casing for a battery charger comprising:
   an independent power source capable of supplying a steady state electrical current;
   electrical circuitry for transforming the steady state electrical current to a predetermined electrical current to charge a battery;

a power wire in electrical communication with the power source and the electrical circuitry;

a battery wire in electrical communication with the electrical circuitry and a battery;

a rigid shell having a first enclosure and an opposing second enclosure; said first enclosure having a mounting flange so that said first enclosure and said second enclosure couple together along said mounting flange to form a shape that simulates a reduced scale motorcycle engine and transmission; said shell further comprising a protective void formed by said first enclosure and said second enclosure to house the electrical circuitry; said shell having a plurality of simulated engine cylinders;

a first indicator LED mounted on the top of a first simulated engine cylinder of the plurality of simulated engine cylinders so that the mode of operation of the battery charger circuitry can be determined;

a second indicator LED mounted on the top of a second simulated engine cylinder of the plurality of simulated engine cylinders so that a first function of an operation of the electrical circuitry can be monitored; and an epoxy material encapsulating the electrical circuitry within the protective void.

2. The rigid shell of claim 1 further comprises a frame that simulates the shape of a reduced scale motorcycle frame and a third indicator LED mounted in a simulated headlight mounted on the frame so that a second function of an operation of the electrical circuitry can be monitored.

3. The rigid shell of claim 2 further comprises a first and a second reduced scale motorcycle wheel disposed about the front and rear perimeter of the frame so that the electrical circuitry is elevated from a floor.

4. The epoxy material of claim 1 wherein the epoxy material further comprises intrinsic heat dissipation properties.

5. A protective casing for a battery charger comprising:
an independent power source capable of supplying a steady state electrical current;
electrical circuitry for transforming the steady state electrical current to a predetermined electrical current to charge a battery;
a power wire in electrical communication with a power plug and the electrical circuitry wherein the power plug is in electrical communication with the independent power source;
a battery wire in electrical communication with a quick connect plug and the electrical circuitry wherein the quick connect plug is in electrical communication with a lead-acid battery;
a rigid shell having a first enclosure and an opposing second enclosure; said first enclosure and said second enclosure couple together to form a shape that simulates a reduced scale motorcycle engine and transmission; said shell having an internal protective void so that any impact force sustained by the shell is isolated from the electrical circuitry;
an epoxy material encapsulating the electrical circuitry within the protective void;
a protective epoxy layer interposed between the bottom plate and the electrical circuitry;
a first indicator LED mounted on the top of a first simulated engine cylinder of the reduced scale motorcycle engine of the shell so that the mode of operation of the battery charger circuitry can be determined; and
a second indicator LED mounted on the top of a second simulated engine cylinder of the reduced scale motorcycle engine of the shell so that a first function of an operation of the electrical circuitry can be monitored.

6. The protective casing of a battery charger of claim 5 further comprising a battery that comprises an auxiliary connect plug so that the battery can be quickly disconnected from the protective casing.

7. The protective casing for a battery charger of claim 6 further comprising a first terminal on the first simulated engine cylinder and in electrical communication with the electrical circuitry and receptive to the battery wire wherein the battery wire is removably attached to the first terminal.

8. The front terminal of claim 7 wherein the first terminal further comprises a quick connect plug.

9. The protective casing for a battery charger of claim 8 further comprising a front terminal disposed on the front of the rigid shell and in electrical communication with the electrical circuitry and receptive to the power wire wherein the power wire is removably attached to the front terminal.

10. The front terminal of claim 9 wherein the front terminal further comprises a quick connect plug.

11. The battery of claim 5 wherein the battery is a 12 volt lead-acid battery.

12. The independent power source of claim 5 is a range between alternating current of 90-250 volts at 50-60 hertz.

13. The electrical circuitry of claim 5 comprises mounted circuit board components.

14. The electrical circuitry of claim 5 operates at 800 mA.

15. The protective casing for a battery charger of claim 5 wherein the casing is moisture proof and submersible.

16. A protective casing for a battery charger comprising:
an independent power source capable of supplying a steady state electrical current;
electrical circuitry for transforming the steady state electrical current to a predetermined electrical current to charge a battery wherein the electronic circuitry comprises mounted circuit board components;
a power wire in electrical communication with a power plug and the electrical circuitry wherein the power plug is in electrical communication with the independent power source;
a battery wire in electrical communication with a quick connect plug and the electrical circuitry wherein the quick connect plug is in electrical communication with the battery;
a rigid shell having a first enclosure and an opposing second enclosure that couple together to form a shape that simulates a reduced scale motorcycle engine and transmission; said shell further comprising a protective void to house the electrical circuitry wherein a bottom plate and the electrical circuitry is removable from the shell so that an alternative shell having a shape that simulates a user selected brand of reduced scale motorcycle engine and transmission can be substituted;
an epoxy material encapsulating the electrical circuitry within the protective void wherein a protective epoxy layer is interposed between the bottom plate and the electrical circuitry;
a first indicator LED mounted on the top of a first simulated engine cylinder of the reduced scale motorcycle engine of the shell so that a first function of an operation of the electrical circuitry can be monitored;
a second indicator LED mounted on the top of a second simulated engine cylinder of the reduced scale motorcycle engine of the shell so that a second function of an operation of the electrical circuitry can be monitored;
an audio computer chip that produces sounds that simulate a motorcycle engine;
a battery that comprises an auxiliary connect plug so that the battery can be quickly disconnected from the casing;
a first terminal in electrical communication with the electrical circuitry and receptive to the battery wire wherein the battery wire is removably attached to the first terminal and comprises a quick connect plug;

a second terminal in electrical communication with the electrical circuitry and receptive to the battery wire wherein the battery wire is removably attached to the second terminal and comprises a quick connect plug; and a front terminal in electrical communication with the electrical circuitry and receptive to the power wire wherein the power wire is removably attached to the front terminal and comprises a quick connect plug.

* * * * *